United States Patent [19] [11] 4,446,183

Savagian [45] May 1, 1984

[54] TAG WITH ATTACHED FOLD-OVER TRANSPARENT COVER ELEMENT

[75] Inventor: Michael D. Savagian, Milwaukee, Wis.

[73] Assignee: W. H. Brady Co., Milwaukee, Wis.

[21] Appl. No.: 412,625

[22] Filed: Aug. 30, 1982

[51] Int. Cl.$^3$ .......... B32B 3/18

[52] U.S. Cl. .......... 428/42; 428/56; 428/77; 428/40; 428/136; 40/2 R

[58] Field of Search .......... 428/40, 41, 42, 192, 428/77, 56, 136; 40/2 R, 10 D; 206/390; 283/21

[56] References Cited

U.S. PATENT DOCUMENTS 3,486,257 12/1969 Walldorf .......... 40/2 R 3,825,463 7/1974 Amann .......... 40/2 R X

*Primary Examiner*—Alexander Thomas

*Attorney, Agent, or Firm*—Quarles & Brady

[57] ABSTRACT

As assembly (10, 210, 310) of a web of tag material (12, 312) and a web of transparent cover element material (13, 313) carrying a layer of transparent pressure sensitive adhesive (14, 314) that is releasably joined to the lower surface of the web of tag material. The web of tag material is divided into individual tags (22–25, 322–325) and the web of cover element material is divided into individual cover elements (34–37, 334–337) in which a cover element associated with a tag has a portion under the tab and a second portion under an adjacent tag. When a tag-cover element unit (11, 311) is separated from the assembly, the second portion of the cover element is foldable over an edge of the tag to protect identification data applied thereto.

8 Claims, 13 Drawing Figures

TAG WITH ATTACHED FOLD-OVER TRANSPARENT COVER ELEMENT

TECHNICAL FIELD

This invention relates generally to the art of tags having an area on which identification information is applied and which is subsequently covered with a transparent element.

BACKGROUND ART

Many types of identification applications require a tag on which a user can apply data. The data can be written on the tags by various means, such as typing, printing with computer printing equipment or other types of printing apparatus, handwriting, etc. This allows the user to apply specific or individual identifying information to a tag, which is then applied to an object.

Further, the user often desires to protect the information that has been written on the tag. However, the systems to afford this type of protection of which I am presently aware are particularly cumbersome to use. In one of the known methods, the user cuts transparent adhesive tape to the size appropriate for covering the information on a tag, and then applies the tape over the written data on the tag. In another system, a separate stock of die-cut pieces of transparent tape is maintained and a piece is applied over data written on the tag. Each of these methods requires the user to maintain stocks of transparent adhesive material for the protective overlaminating sheet, both are cumbersome and inconvenient to use, and either can sometimes involve extra waste material if the transparent element is mounted on a liner. A third prior system consists of a tag and a transparent overlaminating sheet secured along one edge of the upper surface of the tag. The overlaminating sheet has transparent adhesive on its underside that is covered with a liner sheet. After data are applied to the upper surface of the tag, the liner is removed from the overlaminating sheet and the sheet is then adhered over the upper surface of the tag. This construction also requires extra material (such as the liner sheet), is difficult to produce as an assembly having a plurality of units, and is relatively expensive to manufacture.

Some of the principal objects of my present invention are to provide an assembly combining a write-on tag and a transparent cover element which is convenient to use, requires a minimum of material, eliminates the need for a user to maintain separate stocks of tags and transparent protective material, can be produced in the form of an assembly having a plurality of tag and cover element units, and is capable of being readily manufactured in large quantities at reasonable cost. Another principal object is to provide a more specific version of a tag and cover element combination having the foregoing characteristics that is particularly adapted for facile removal of a tag and its associated cover element from an assembly thereof, and to provide an assembly of tags and cover elements that is capable of being guided along its edges. Other more specific objects will appear in the description which follows:

DISCLOSURE OF INVENTION

My new tag construction comprises (1) a tag having a printable area on its front surface, and (2) a transparent cover element with transparent pressure adhesive on one of its surfaces that is releasably adhered to the back surface of the tag, wherein the cover element is only partially overlapped with the tag. After data are printed on the front surface of the tag, the cover element is folded over and adhered to the front surface of the tag to cover the data, which are then protected by and visible through the cover element. The invention also relates to an assembly including a web of tag material and a web of transparent cover material having transparent pressure sensitive adhesive on one of its surfaces, in which the cover material is releasably joined to the rear surface of the tag material by means of said adhesive; the tag material is divided into individual tags, each having a printable area; and the web of transparent cover material is divided into individual cover elements, with a cover element being only partially overlapped with its respective tag. A tag can be removed from the assembly together with its respective cover element which extends from the tag and has a portion that can be folded over and adhered to the front surface of the tag to cover data applied thereto.

BRIEF DESCRIPTION OF DRAWINGS

This invention is fully described as required under 35 U.S.C. Section 112 in the following detailed description made in reference to the accompanying drawings, in which.

BEST MODES FOR CARRYING OUT THE INVENTION (a) Description of FIGS. 1–6.

Figure 5:
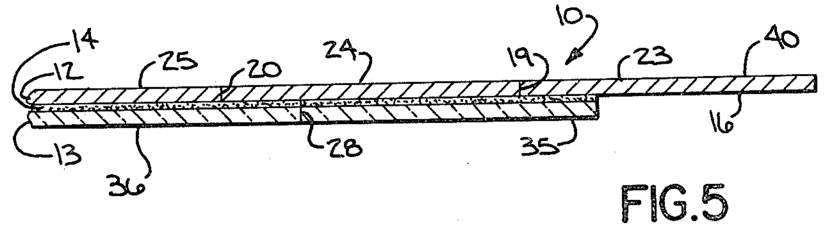
FIG. 5 is a longitudinal view of the assembly of FIGS. 1 and 2 after the endmost tag and cover element unit has been removed from the assembly.
Figure 6:
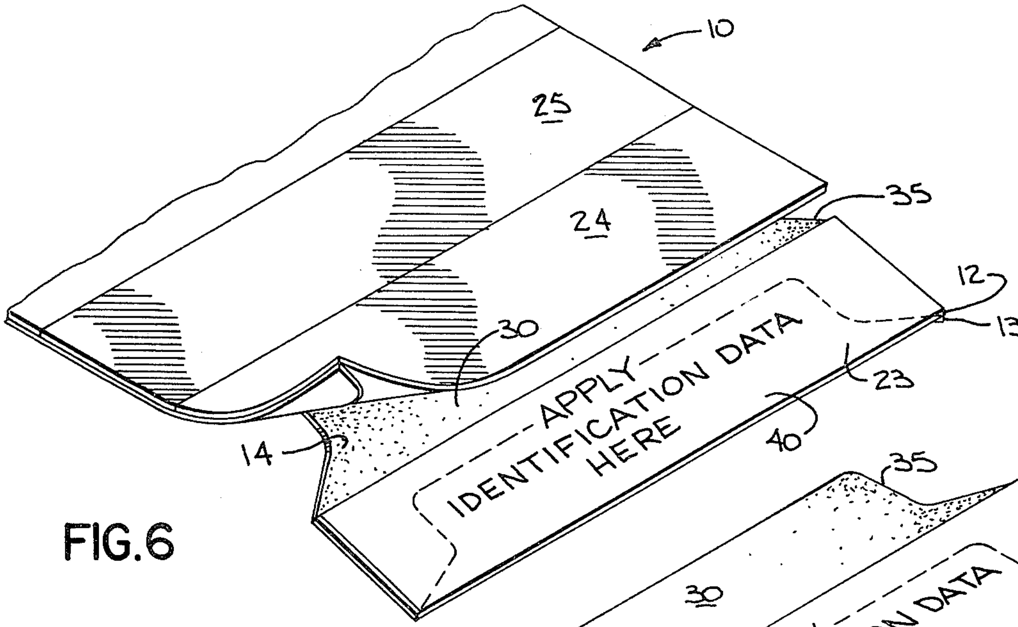
FIG. 6 is a perspective view of the assembly of FIGS. 1 and 2 illustrating its second tag and associated cover element in the process of being detached from the assembly.
Figure 7:
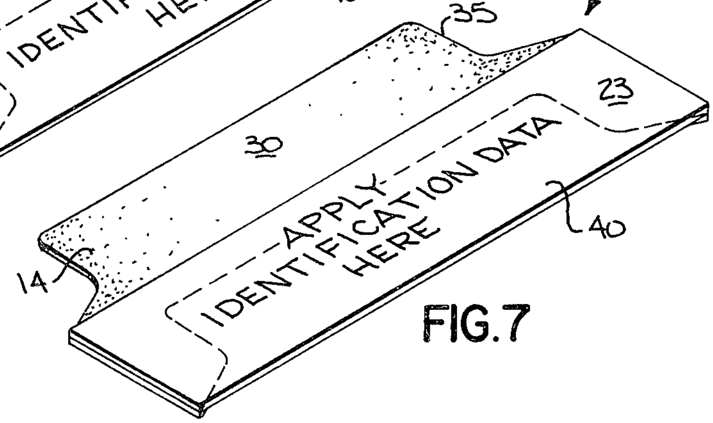
FIG. 7 is a perspective view of a tag and its associated cover element after having been removed from the assembly.
Figure 8:
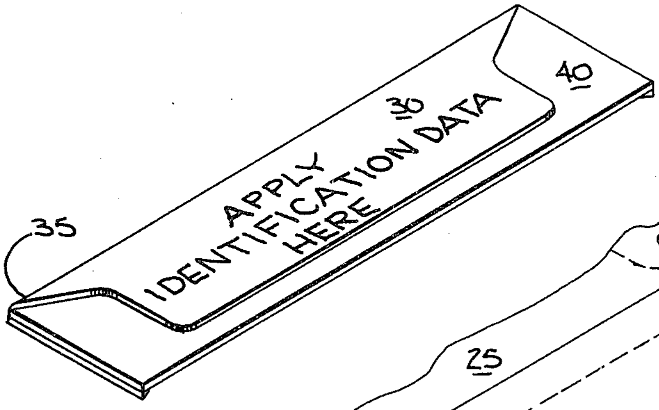
FIG. 8 is a perspective view of the tag of FIG. 7 with its associated cover element folded over data written on its front surface.

An assembly 10 of tags according to the present invention is illustrated in FIGS. 1–6, and an individual tag-cover element unit 11 is shown in FIGS. 7 and 8 after having been separated from the assembly 10.

The assembly 10 comprises a web 12 of tag material and a web 13 of cover element material. The web 13 carries a layer 14 of transparent pressure sensitive adhesive on its surface 15 (see FIG. 3). The layer 14 of pressure sensitive adhesive is releasably joined to the rear surface 16 of the web 12 to form the composite assembly. The adhesion of the layer 14 of pressure sensitive adhesive to the surface 15 of the web 13 is to be greater than the adhesion of the pressure sensitive adhesive to the surface 16 of the web 12. The layer 14 of adhesive is releasably joined to the web 12, by which is meant that the adhesive layer will cleanly separate therefrom without significant transfer of adhesive to the surface 16, for the purpose described herein below.

The web 12 is divided by a series of spaced parallel slits, e.g. 18, 19 and 20, into a series of individual tags, e.g. 22, 23, 24 and 25. The slits 18–20 extend transversely across the assembly as illustrated in FIG. 1, and they penetrate only through the web 12 but not into the web 13, see especially FIG. 3.

Figure 1:
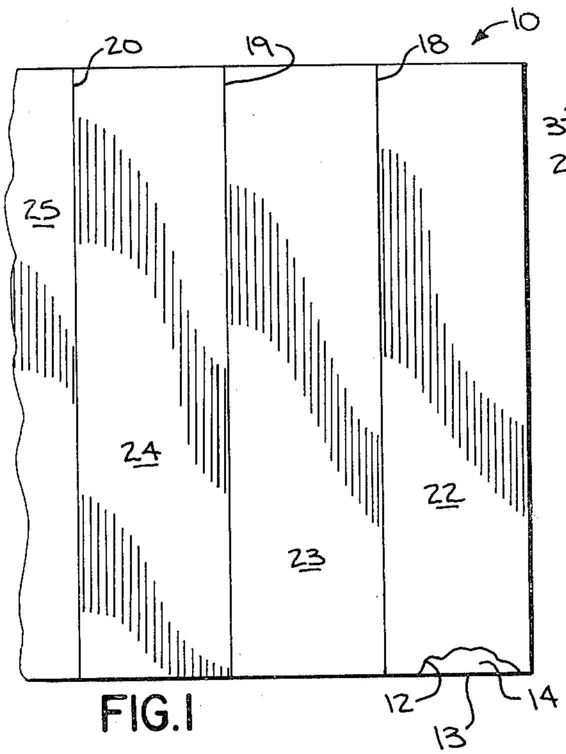
FIG. 1 is a plan view, with portions broken away, of the top of an assembly of tags and cover elements according to this invention.
Figure 2:
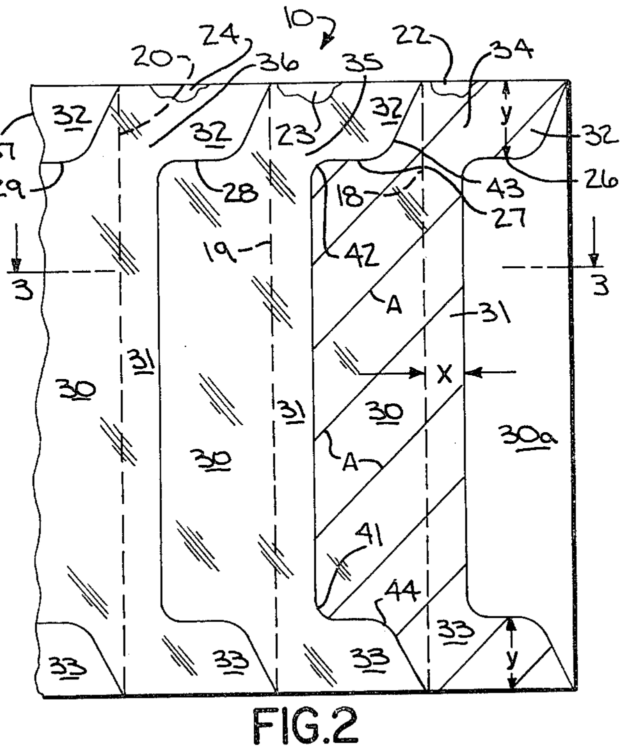
FIG. 2 is a plan view, with portions broken away, of the underside of the assembly illustrated in FIG. 1.
Figure 3:
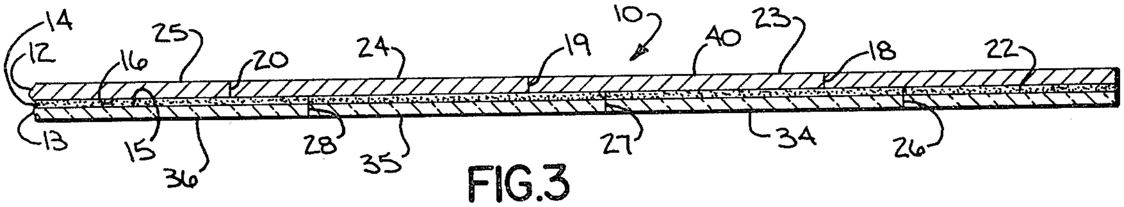
FIG. 3 is a longitudinal sectional view of the assembly of FIGS. 1 and 2.
Figure 4:
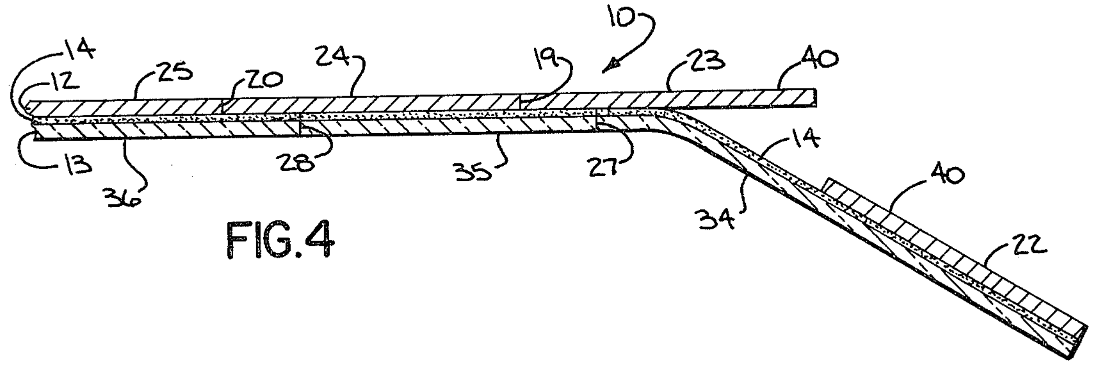
FIG. 4 is a longitudinal sectional view of the assembly of FIGS. 1 and 2 illustrating the endmost tag and its associated cover element in the process of being removed from the assembly.

FIG. 2 illustrates the reverse side of the assembly 10 from that illustrated in FIG. 1. The web 13 of cover element material is depicted in the drawings as a web of transparent film material, and the layer 14 is transparent pressure sensitive adhesive. Consequently, the slits 18–20 formed in the web 12 are visible through the web 13 and illustrated in dashed line in FIG. 2 to depict this condition; similarly, the tags 22–25 are visible through the transparent web 13 and a portion of the web 13 is broken away to expose a part of each tag.

The web 13 is cut into a series of adjacent cover elements by means of a set of evenly spaced generally U-shaped slits 26, 27, 28 and 29 that extend through the web 13 and the pressure sensitive adhesive layer 14, but do not extend into or penetrate the web 12 of tag material. Each cover element comprises a flap 30 joined to a connecting portion 31 and wings 32 and 33 that extend from the connecting portion 31 on the opposite side thereof from a flap 30. The individual cover elements are indicated by the general reference numerals 34, 35, 36 and 37 in FIG. 2, each consisting of a flap 30, connecting portion 31 and wings 32 and 33. Cover element 34 is associated with the tag 22, cover element 35 is associated with the tag 23, cover element 36 is associated with the tag 24, and cover element 37 is associated with tag 25. The connecting portion 31 and wings 32 and 33 of each covering element are adhered to the surface 16 of the tag with which a cover element is associated. Thus, with respect to the cover element 34, its connecting portion 31 and wings 32 and 33 are adhered to the surface 16 of the tag 22. However, the flap 30 of the cover element 34 is adhered to the surface 16 of the tag 23, i.e. the tag adjacent to the tag 22. The cover elements 35, 36 and 37 are similarly arranged relative to their respective tags in that the flap 30 of each such element underlies the tag adjacent to its associated tag and its connecting element 31 and wings 32 and 33 are adhered to its respective associated tag. This arrangement thus provides a cover element having some portions adhered to its associated tag and another portion adhered to the tag adjacent to its associated tag in the assembly 10. In order to clarify this relationship in the drawings, the cover element 34 associated with the tag 22 is emphasized in FIG. 2 by means of diagonal crosshatch lines A, it being understood that the crosshatching is for the purposes of illustration only and are not a part of the assembly 10.

The use of the assembly 10 and its respective individual tags is illustrated by reference to FIGS. 4–8. A user applies selected alpha-numeric identification data to the top or exposed surface 40 of a tag of the web 12 of the assembly. The identification data can be applied mechanically, such as by typewriter, computer printer or other types of printing apparatus, or manually such as by writing in ink or pencil. After applying the requisite data to a tag, such as the endmost tag 22, referring now to FIG. 4, the user bends the tag 22 downwardly to separate the tag from the assembly along the slit 18 and peels the flap 30 of the cover element 34 away from the assembly along the slit 26. Because the pressure sensitive adhesive 14 on the flap 30 of the cover element is releasably joined to the rear surface 16 of the web 12, the adhesive is readily peeled from the underside of the adjacent tag 23 and remains affixed to the flap 30 of the cover element. However, the connecting portions 31 and wings 32 and 33 remain adhered to the tag 22 because pressure sensitive adhesive is stronger in shear than in peel, i.e. less force is required to peel the pressure sensitive adhesive away from tag 23 than to shear it off tag 22. After completely detaching the tag 22 from the assembly 10, the flap 30 of the cover element 34 extends beyond a free edge of the tag 22, more particularly the edge thereof defined by the slit 21. The user then folds the flap 30 over such edge of the tag 22 and adheres it to its upper surface 40 so as to cover the data applied thereto. The tag 22 is somewhat atypical as compared to other tags of the assembly in that its underside includes a flap 30*a* that is not used (see FIG. 2) when the web 12 and web 13 are cut to the same length.

The assembly 10 after removal of the endmost tag 22 is illustrated in cross-section in FIG. 5 and in perspective in FIG. 6. The undetached tags 23–25 and their associated cover elements 35, 36 respectively are retained in assembly form since the cover elements extend across and are adhered to two adjacent tags. Thus, the structural integrity of the assembly is retained by reason of the cover elements bridging a pair of adjacent tags. With respect to the remaining tags of the assembly, as best illustrated in FIG. 5, the rear surface 16 of the now endmost tag 23 will be uncovered except for the portion thereof to which the connecting element 31 and wings 32 and 33 of its associated cover element 35 are adhered.

The separation from the assembly of tag 23 and its associated cover element 35 is illustrated in FIG. 6. The separation process is the same as described above, namely, detachment of tag 23 along slit 19 and detachment of cover element 35 along slit 27. This detachment is accomplished manually. After being separated from the assembly, the tag 23 and its associated cover element 35 form an individual tag-cover element unit 11 as depicted in FIG. 7. The connecting portion 31 and wings 32 and 33 are adhered to the rear surface 16 of the tag 23 as indicated in dotted lines in FIGS. 6 and 7 and the flap 30 extends beyond an edge of the tag. After the flap 30 has been folded over to cover data applied to the exposed surface 40 of the tag 23, the unit appears as shown in FIG. 8. The flap 30 forms a protective transparent shield over the data applied to the surface 40 of the tag 23. The tag in the condition of FIG. 8 can then be applied to the object which is to be identified in any suitable manner, such as by stapling, or punching a hole near one edge of the tag and tying it to the object with a string or wire, etc.

The connecting portion 31 and wings 32 and 33 of a cover element 34–36 are to be adhered to the lower surface 16 of the tag with which each cover element is associated with sufficient force that the cover element will remain associated with a tag when the tag is removed from the assembly in the manner discussed above. The width of a connection portion 31, i.e. the dimension "X" in FIG. 2 and the width of the arms 32 and 33, i.e. the dimension "Y" in FIG. 2, should be selected so as to provide the appropriate degree of adhesion taking into account the adhesive strength of the layer 14 of pressure sensitive adhesive and the release characteristics of the surface 16 of the web 12. The wings 32 and 33 of the covering elements aid in retaining a covering element with its associated tag when the tag is detached from the assembly 10. Further, however, the wings 32 and 33 provide another important function in that they reinforce the longitudinal edges of the assembly 10. This provides support for the edges of the assembly, which can be particularly important when the assembly is guided along its edges through printing apparatus for the application of data to the tags.

Further, in order to facilitate the peeling of a flap 30 of a cover element from the underside of the tag to which it is adhered by the adhesive 14, I have found it useful to form the corners 41 and 42 of a flap 30, see the cover element 34 in FIG. 2, in a round or arcuate shape and to form the junction between a flap 30 and connecting portion 31 in a round or arcuate shape as illustrated by the portions 43 and 44 of the flap of the cover element 34 in FIG. 2. This construction for the slits 27, 28 and 29 in the assembly has proved to be a particularly useful and effective means of providing for ready separation of a flap 30 from the assembly when its associated tag is to be removed therefrom.

Figure 9:
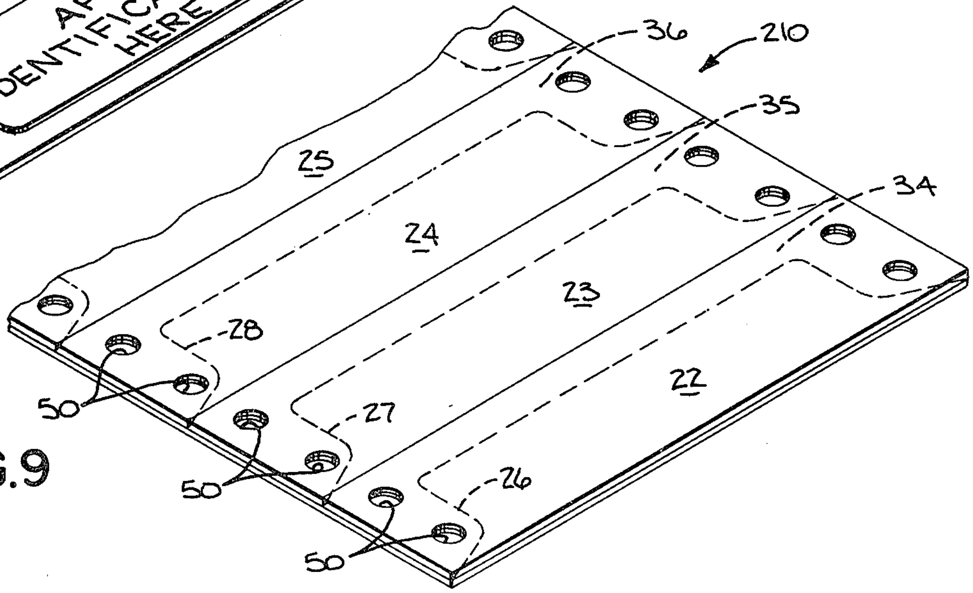
FIG. 9 is a perspective view similar to FIG. 6 of a second embodiment of the present invention.

(b) Description of FIG. 9.

FIG. 9 illustrates a second assembly 210 according to the present invention which is of the same construction as the assembly 10 of FIGS. 1–8 except that a row of evenly spaced apertures 50 are formed along each longitudinal marginal edge portion of the assembly. The aperture 50 are meant for engagement with a web sprocket drive such as associated with line printers used with word processing equipment and computer printers. This allows the use of automatic printing equipment to apply data to the top surface of each tag 22–25, etc. of the assembly, and is often employed by users who must print a large number of tags with sequential identification data. The apertures 50 may also be used to apply an individual tag-cover element unit detached from the assembly 210 to an object by tying a string through an aperture.

(c) Description of FIGS. 10–13.

Figure 10:
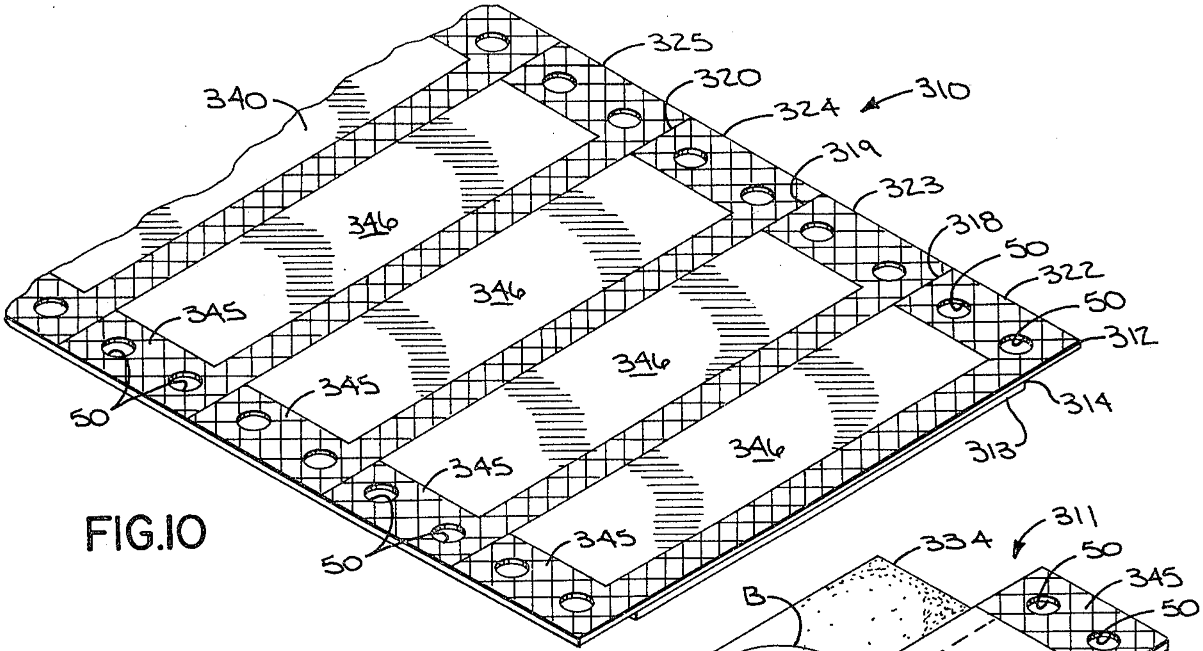
FIG. 10 is a perspective view of a third embodiment of an assembly of tags and cover elements according to this invention.
Figure 13:
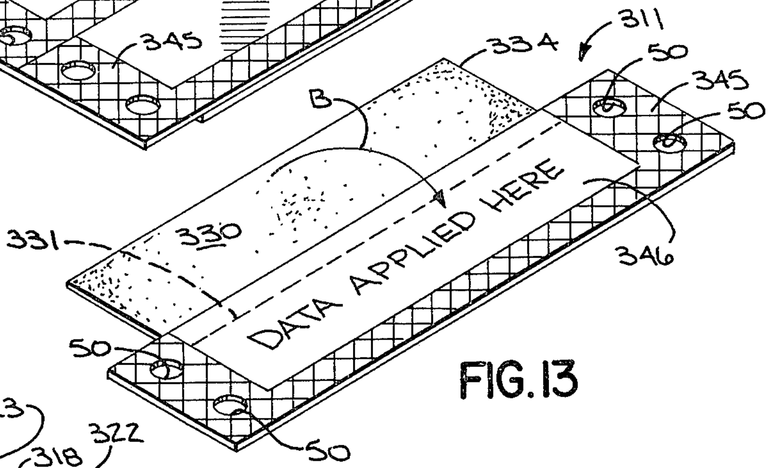
FIG. 13 is a perspective view of an individual tag and its associated cover element after having been detached from the assembly of FIG. 10.
Figure 11:
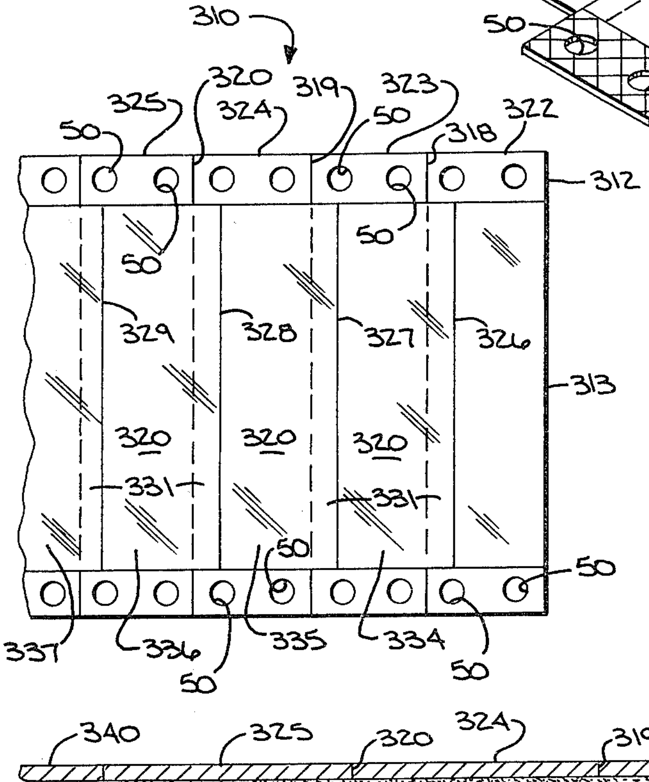
FIG. 11 is a plan view of the upper surface of the assembly of FIG. 10.

A third embodiment of the present invention is illustrated in FIGS. 10–13, comprising an assembly 310 formed by web 312 of tag material and web 313 of cover element material joined together by means of layer 314 of pressure sensitive adhesive carried on the surface 315 of the web 313 and releasably joined to the lower surface 316 of the web 312. The web 312 is wider than the web 313 as best depicted in FIGS. 10 and 11.

Figure 12:
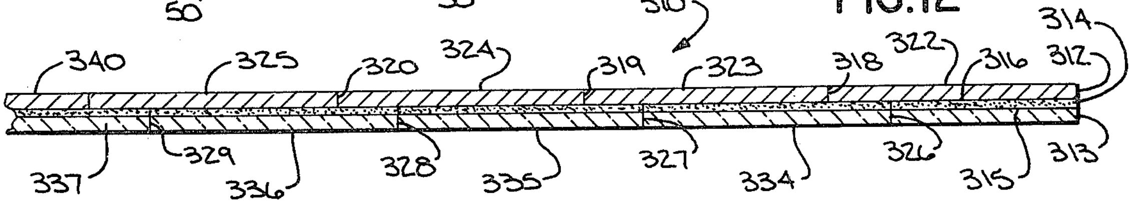
FIG. 12 is a longitudinal sectional view of the assembly of FIG. 10.

A series of spaced parallel transverse slits 318, 319 and 320 extend across the web 312 to divide it into individual tags 322, 323, 324 and 325. The slits 318–320 penetrate only the web 312 as indicated in FIG. 12.

Referring now to FIG. 11, a series of spaced parallel slits 326, 327, 328 and 329 extend transversely across the web 313 to divide it into a series of individual cover elements 334, 335, 336 and 337. Each cover element is rectangular in shape and consists of a connecting portion 331 adhered to the lower surface of one tag and flap 330 adhered to the lower surface of an adjacent tag. The cover element 334 associated with tag 322 has its flap 330 adhered to the adjacent tag 323 and its connecting portion 331 adhered to the tag 322. The cover elements associated with the tags are similarly arranged. The slits 326–329 extend only through the web 313 and layer 314 of adhesive as shown in FIG. 12 and are parallel to but offset from the slits 318–320 by the width of a connecting portion 331.

Returning to FIG. 10, each tag 322–325 has a border 345 defined about three of its sides. The borders 345 may be printed on the web 312. Each border 345 outlines a print zone 346 on each tag, which is of the same size as the portion of the exposed upper surface 340 of each tag that will be covered by a flap 330 of its associated cover element. The border thus demarcates a print zone for the user within which identification data can be applied, so that the user is thereby assured the data will be protected by the flap of a cover element.

The separation of a tag and its associated cover element from the assembly 310 is the same as described above with prior embodiments. For example, after applying data within a print zone 346 of the tag 322, the user separates tag 322 from the assembly along the slit 318 and peels the flap 330 of its associated cover element 334 from the underside of the adjacent tag 323. During this separation process, the adhesive along the connecting portion 331 of the cover element 334 acts to retain the cover element with its associated tag 322. A detached tag-cover element unit 311 is illustrated in FIG. 313. The user folds the flap 330 of the cover element 334 around an edge of the tag and adheres it to the upper surface 340 of tag 322 as indicated by the arrow B. The data applied within the print zone 346 are thereby covered and protected by the flap 330 yet visible therethrough.

The assembly 310 is illustrated as having apertures 50 defined along its opposed longitudinal marginal edge portions for the purpose explained above in connection with the embodiment of FIG. 9.

(d) General Description.

The webs 12 and 312 of tag material described in connection with the embodiments described above can be of any suitable material normally used in the tag or label art. For example, these webs may be paper, tag board, synthetic nonwoven webs, or a plastic film which has a suitable printable coating on its upper surface that can receive data to be applied by printing or hand application. Suitable plastic films include polyolefins such as polyethylene, polyester films, vinyl films, etc. Many types of printable coatings suitable for use on plastic films are generally known in the art, and usually include for example, an absorbant filler such as silica or calcium carbonate dispersed in a polymeric binder such as a polyester or vinyl resin.

The webs 13 and 313 of cover element material described above are most preferably a web of transparent plastic film; films of polyolefins, such as polyethylene or polypropylene, polyester, vinyl, etc. are suitable. The layer 14 and 314 of transparent pressure sensitive adhesive carried by such webs can be any suitable formulation of which many types are generally known in the art, and typically comprise synthetic or natural rubber, or a synthetic polymer or copolymer, compounded with compatible resin tactifiers such as terpene resins, ester gum, etc., and dispersed in an appropriate solvent such as an organic solvent or water. The term "transparent" as used herein and in the claims with reference to the covering element and the adhesive carried thereon is defined as meaning that data applied to a tag are to be visible through a covering element associated with the tag. Thus the term is meant to include materials which are normally considered transparent, but also those which are often regarded as translucent inasmuch as data applied to a tag will be visible through translucent adhesive and/or translucent covering element that is adhered immediately over the data.

The lower surface 16 of a web 12 or 316 of a web 312 may carry a suitable release coating if the material of the web is not inherently releasable with respect to pressure sensitive adhesive. This surface of the webs 12 and 312 can be coated or impregnated with suitable release materials, of which silicone coatings, carbamate coatings, and other types of release coatings are well known in the art.

Industrial Applicability

The tag-cover element units described hereinabove may be used for any identification application. For example, the units may be applied to identify baggage, electrical wires in a harness, pipes and tubing, panels, etc. The units may also be employed as identification badges, such as at conventions and the like, and can be pinned to a person's clothing. The tag-cover element unit can be applied to any selected object by means of a string, staple, strip of adhesive tape, etc. The units can be made in various sizes so as to accommodate the many types of identification purposes.

The assemblies of tag-cover element units, illustrated above as the assemblies 10, 210 and 310, can be supplied to an end user in roll form, stacks of individual sheets, or in a fan-fold arrangment. Thus the assemblies can be furnished in a physical form which will be convenient to feed through a high speed printer such as associated with computers or word processing equipment. It is believed that the novel construction of the tag-cover element units as described above permits the production of assemblies having tags and a protective overlaminating cover element in all of these forms for the first time.

While my present invention has been described by reference to three specific embodiments, various modifications can be made to the illustrated embodiments that are within the scope of the invention. For example, the border 345 on the tags of the third embodiment can be incorporated in the first two embodiments. The apertures 50 along the marginal portions of the third embodiment can be eliminated if so desired. The web 313 of cover element material in the embodiment 310 is illustrated as being narrower than the web 312 of tag material, but it can be made of the same width as the latter if so desired. Slits 18–20 and 318–320 are shown as defining individual tags in the specific embodiments, and slits 26–29 and 326–329 as defining individual covering elements. While the slits are illustrated as continuous cut lines extending through their respective webs, they may also be discontinuous cut lines such as a line of perforations or separated small slits or include small sections of uncut portions of the webs; in some instances, these latter constructions for the slits will aid in preserving the integrity of an assembly after removal of one or more tags, depending upon the nature of the particular adhesive or release coating employed in an assembly. Thus the term "slit" as used in the claims is meant to encompass continuous or discontinuous cut lines formed in a web or layer. These modifications to the specific embodiments described above, and others which may suggest themselves to those of ordinary skill in the art, are intended to be embraced by the appended claims as within the true spirit and scope of this invention.

I claim:

1. As assembly having a plurality of tag-cover element units in which the cover element associated with a tag includes a portion adapted to be adhered to a surface of the tag after the application of identification data thereto, the assembly including (1) a web of tag material having an upper surface and a lower surface, (2) a web of transparent cover element material carrying a layer of transparent pressure sensitive adhesive on one of its surfaces, (3) the layer of transparent pressure sensitive adhesive on the web of cover element material being releasably joined to the lower surface of the web of tag material to form the assembly, the improvement wherein:

(4) a series of spaced slits extend through the web of tag material to define a plurality of individual adjacent tags;

(5) a series of spaced slits extend through the web of cover element material and layer of pressure sensitive adhesive carried thereon to define a plurality of individual adjacent cover elements, there being one cover element associated with each tag,
the cover element associated with each tag having a connecting portion adhered to the lower surface of the tag and a flap adhered to the lower surface of an adjacent tag;

(6) each tag and its associated cover element being detachable from the assembly along the aforesaid slits to provide a tag-cover element unit including a flap extending beyond an edge of the tag and an exposed portion of the layer of pressure sensitive adhesive on the flap,
the flap being foldable over said edge of the tag and adherable to the upper surface of the tag for protection of identification data applied thereto.

2. An assembly according to claim 1, wherein: the slits defining the cover elements are linear slits extending across the web of cover element material and layer of pressure sensitive adhesive carried thereon to define a rectangular flap and rectangular connecting portion.

3. An assembly according to claim 1, wherein: the spaced slits defining the cover elements are generally U-shaped slits extending through the web of cover element material and layer of pressure sensitive adhesive carried thereon to define a cover element including (a) a connecting portion under a first tag, (b) a pair of wings extending from the connecting portion under the first tag, there being one wing along each of two opposed edge portions of a tag, and (c) a flap extending from the connecting portion and located under a second tag adjacent to the first tag.

4. An assembly according to claim 3, wherein: the flap of each cover element has curved corners remote from the connecting portion and outwardly curved portions at its junction with the connecting portion, and the wings have curved corners remote from the connecting portion.

5. An assembly according to claim 1, 2, 3 or 4 wherein:

the slits defining the tags and the slits defining the cover elements are continuous cut lines extending through the respective webs.

6. An assembly according to claim 1, 2, 3 or 4 wherein:

the web of tag material and the web of cover element material are of the same width.

7. An assembly according to claim 1, 2, 3 or 4 wherein:

the web of tag material is wider than the web of cover element material.

8. An assembly according to claim 1, 2, 3 or 4 wherein:

each individual tag of the assembly includes a border around three of its sides that demarcates a print zone to be covered by the flap of its associated cover element.

* * * * *

UNITED STATES PATENT AND TRADEMARK OFFICE

CERTIFICATE OF CORRECTION

PATENT NO. : 4,446,183

DATED : May 1, 1984

INVENTOR(S) : Michael D. Savagian

It is certified that error appears in the above—identified patent and that said Letters Patent is hereby corrected as shown below:

Abstract, line 10, "tab" should be --tag--.
Col. 1, line 61, change the ":" to a --.--.
Col. 4, line 20, "portions" should be --portion--.
Col. 5, line 42, "aperture" should be --apertures--.
Col. 8, line 9, (first line of claim 1), "As" should be --An--.

Signed and Sealed this

*Twenty-first* Day of *August 1984*

[SEAL]

*Attest:*

GERALD J. MOSSINGHOFF

*Attesting Officer* *Commissioner of Patents and Trademarks*